(12) United States Patent
Didosyan

(10) Patent No.: US 7,158,301 B2
(45) Date of Patent: Jan. 2, 2007

(54) METHOD AND DEVICE FOR MODIFYING THE POLARIZATION STATE OF LIGHT

(76) Inventor: Yuri S. Didosyan, Johann-Strauss-Gasse 10-14/2/5, A-1040 Vienna (AT)

( * ) Notice: Subject to any disclaimer, the term of this patent is extended or adjusted under 35 U.S.C. 154(b) by 158 days.

(21) Appl. No.: 10/504,130

(22) PCT Filed: Feb. 12, 2003

(86) PCT No.: PCT/AT03/00042

§ 371 (c)(1),
(2), (4) Date: Sep. 29, 2004

(87) PCT Pub. No.: WO03/069395

PCT Pub. Date: Aug. 21, 2003

(65) Prior Publication Data

US 2005/0128729 A1   Jun. 16, 2005

(30) Foreign Application Priority Data

Feb. 12, 2002   (AT) ............... A 216/2002

(51) Int. Cl.
*G02B 27/28* (2006.01)
(52) U.S. Cl. ............ 359/484; 359/280; 359/281; 359/282
(58) Field of Classification Search ........ 359/280–283, 359/483, 484
See application file for complete search history.

(56) References Cited

U.S. PATENT DOCUMENTS

| 3,526,883 A | | 9/1970 | Tabor | |
| 3,831,156 A | * | 8/1974 | Myer | 359/282 |
| 4,220,395 A | | 9/1980 | Wang et al. | |
| 4,495,492 A | | 1/1985 | Anderson et al. | |
| 4,550,983 A | * | 11/1985 | Ross | 359/282 |
| 4,893,910 A | * | 1/1990 | Birecki | 359/282 |
| 5,192,862 A | * | 3/1993 | Rudd, III | 359/280 |
| 5,344,720 A | | 9/1994 | Belt et al. | |
| 5,473,466 A | * | 12/1995 | Tanielian et al. | 359/282 |
| 5,493,222 A | * | 2/1996 | Shirai et al. | 359/280 |
| 5,535,046 A | * | 7/1996 | Shirai et al. | 359/281 |
| 5,703,710 A | * | 12/1997 | Brinkman et al. | 359/283 |
| 5,801,875 A | * | 9/1998 | Brandle et al. | 359/281 |
| 6,618,182 B1 | * | 9/2003 | Didosyan | 359/280 |

FOREIGN PATENT DOCUMENTS

WO   0120390   3/2001

* cited by examiner

*Primary Examiner*—Evelyn A. Lester
(74) *Attorney, Agent, or Firm*—Dykema Gossett PLLC

(57) ABSTRACT

A magnetic, single-axis crystal is used to modify the polarization state of light, whereby light passes through predetermined areas of the crystal. To change the polarization state of the light, a magnetic field pulse is applied to the crystal with a magnetic field amplitude, at which the crystal no longer remains in the single-domain state at the end of the pulse, but returns to a defined multi-domain state that is determined by the direction of the applied magnetic field, thus achieving large usable apertures of the switching element and extremely short change periods. According to the invention, energy is only required for the change operation and not for maintaining a specific state.

6 Claims, 1 Drawing Sheet

Table 1

| Area | Positive Pulse | | Negative Pulse | |
|---|---|---|---|---|
| | During Pulse | After Pulse | During Pulse | After Pulse |
| 1 | + | + | − | − |
| 2 | + | − | − | + |

METHOD AND DEVICE FOR MODIFYING THE POLARIZATION STATE OF LIGHT

OBJECT OF THE INVENTION

The invention relates to a method for modifying the polarization state of light with a magnetic, single-axial crystal that changes to a single-domain state under the influence of an outer magnetic field pulse whereby light passes through the predetermined areas of the crystal, as well as a device to carry out such a method. Objects of the invention are methods and devices for modifying the polarization of light beams as they are employed in optical communications systems, information processing, displays etc. based on modifying the direction, the intensity, and the like, of these light beams.

BRIEF DESCRIPTION OF THE STATE-OF-THE-ART

Many types of optical switching elements have been developed up to now including micro-electric mechanical systems (MEMS), acoustic-optical, liquid crystalline, electronic switchable Bragg gratings, bubble jets, thermo-optical, inter-ferrometric, thermo-capillary, electro-holographic, and magneto-optical systems. MEMS are mostly used at the present. An important advantage of MEMS is the fact that they belong to the so-called "latching systems", which means that they have non-energy stable switching states and need energy only for the switching operation.

However, their switching time is rather lengthy: approximately 1 ms. Electro-optical systems have relatively much shorter switching times; for example, the switching time of the new electro-holographic switching elements is only approximately 10 ns. Nevertheless, these switching times need a permanent energy supply at least in one state. Besides, the insertion loss of electro-holographic switching elements is rather high: namely about 4–5 dB.

With magneto-optical systems there is created the possibility to combine a short switching time and a low insertion loss with the so-called latching function (see above). A multi-stable polarization rotator is described in the invention according to the Austrian patent No. 408.700. Stable states are guaranteed with this rotator through inhomogeneities on the surface of orthoferrite platelets which hold the domain walls (DW) in predetermined positions. Transition between these stable states occurs through displacement of the domain walls between these positions and it takes place without the creation of new domains. The time required for these transitions is approximately 100 ns, which means that they are faster by several thousand-fold than the ones for other optical switching elements of the latching kind. However, the aperture of the switching element is considerably restricted. The amplitude of the magnetic field of the driver is rather low and this is the cause that domain walls can move only a relatively short distance.

It is the object of the invention to reduce the restrictions of the aperture of the switching element.

This is achieved according to the present invention in that a magnetic field pulse is applied to the crystal with a magnetic field amplitude (H) at which the crystal no longer remains in the single-domain state at the end of the pulse, but returns to a defined multi-domain state determined by the direction of the applied magnetic field. Thus, the aperture of the switching element is enlarged by the use of magnetic field pulses of greater amplitude. The aperture is defined thereby through the zone that is biased by alternating magnetic pulses. This zone represents in the present invention the domain structure occurring after switching the magnetic pulses off. Relatively large domains appear in orthoferrites whereby correspondingly large apertures of the switching element can be achieved.

Orthoferrites have a right-angled hysteresis function. The coercive force of the orthoferrites is rather high—it is a few kilo-Oersted (kOe). A large energy output is required for the necessary creation of large magnetic fields to overcome the coercive force (this factor is of special importance in the construction of densely-packed switch matrixes) and it can also result in increased inductivity of the system, which lengthens the switching time. Inhomogeneities are used on the crystal surface to decrease the required intensity of the driver field whereby said inhomogeneities fix the domain walls in the predetermined positions. If the distance between the inhomogeneities is short or when thin orthoferrite platelets are used, then the domain walls move from one inhomogeneity to the other. This thickness is ≈100 micrometer used in polarization rotation in the visible or nearly visible infrared spectrum range. It has been found that there is another situation with a thicker pattern, namely in case of yttrium orthoferrite crystals of a ≧1.2 mm thickness, which are used for a 45° polarization rotation at the wavelength of ≧1.3 micrometer. The use of the magnetic fields on these crystals, which are rather strong to change magnetization in the large areas, causes now the creation of new domains and their expansion, collapse of domain with unfavorable magnetization direction, and magnetization of the crystal as a result thereof. Should the amplitude of the magnetic field pulse be rather high (a few kOe), then the crystal remains in a mono-domain state after the end of this pulse and changes of the magnetization direction require again the use of pulses with equal or even higher amplitudes.

If, however, the amplitude H of the pulses is not very high and is just enough to achieve saturation magnetization of the crystal ($H=H_s$), then the crystal returns again to the multi-domain state at the end of the pulse (nuclei of the oppositely magnetized domains are, in fact, not totally suppressed and at the end of the pulse they grow again into new domains).

Additional characteristics and advantages of the invention method and the corresponding device are described in more detail in the following with the aid of Table 1 and the drawings.

BRIEF DESCRIPTION OF THE DRAWINGS

Table 1 shows the direction of the magnetization in two crystal areas during and after, clock-wise and counter clockwise, pulse applications.

Figure 1A:
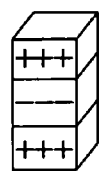
FIGS. 1a, 1b, and 1c show the magnetizations in domains of an orthoferrite crystal during a pulse.
Figure 1B:
Figure 1C:
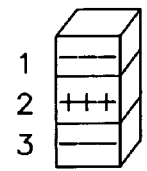

In some cases, the direction of magnetization is changed to the opposite in specific crystal areas after the use of the pulses ($H \leq H_s$): An orthoferrite crystal is now viewed which is sectioned perpendicular to the optical axis. The domain walls in such a crystal are oriented perpendicular to the direction of the crystallographic a-axis (see FIG. 1). The magnetization is positive in the upper and lower domains and negative in the center domain (FIG. 1a). A magnetic field pulse of negative polarity influences now the crystal. The crystal is magnetized up to the single-domain state when the amplitude of the crystal is approximately $H_s$ (see FIG. 1b). The crystal subdivides in the domains at the end of the pulse (see FIG. 1c). The coupling forces are rather high in the lower and upper area of the crystal and the direction of magnetization remains the same as during the pulse. However, the direction of magnetization becomes negative in the center area where coupling forces are weaker. Inhomgeneities can be used again for the stabilization of the domains as they are described in the invention No. 408.700.

If light beams are now guided into different crystal areas, then the polarizations of the various beams are changed dependent on the magnetic driver field and the position of the beams. In the example in Table 1, the polarization of the beams passing through area 1 are characterized with "+" (which means that the polarization direction has rotated clockwise), and the polarization of the beams passing through areas 2 are characterized with "−" (the polarization direction has rotated counter-clockwise). Should a magnetic field pulse of negative polarity be applied, then the polarization of the two beams would be "minus" during the pulse. The polarization of beams 1 and 2 would correspondingly be "−" (for 1) and "+" (for 2) at the end of the pulse. The application of a magnetic field pulse of positive polarity leads to the new distribution "+" and "+" and at the end of this pulse there is created again the state "+" and "−". A desired polarization distribution or polarization combination can be achieved through the selection of polarity and the chosen duration of pulses.

In the invention according to the Austrian patent No. 408.700, inhomogeneities (i.e. cracks or scratches) on the crystal surface, through which light beams pass, are used to fix the domain walls. These inhomogeneities on the surface cause a light dispersion especially in the employment of such crystals in attenuators.

Figure 2:
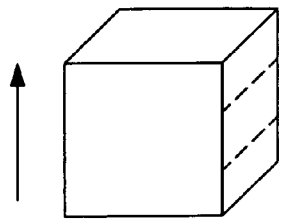
FIG. 2 shows inhomogeneities in the side of a rotator.

Deviating from the arrangement according to the Austrian patent No. 408.700, inhomogeneities (such as scratches) are applied to the side or sides of the crystal. FIG. 2 shows such inhomogeneities in the form of cracks or scratches on the side of a rotator. The direction of the cracks or scratches are perpendicular to the crystallographic a-axis and parallel to the planes of the domain walls.

Relatively thin platelets are to be used to guarantee continuous movement of the domain walls across large distances ("relative thin" means platelets of a few hundred micrometers in thickness). In a very wide area of the magnetic field amplitude there exists the influence of the magnetic field onto these platelets in the expansion of the present domains with an appropriate polarity and not in the creation of new domains. The inhomogeneities hold the domain wall in the desired positions whereby a multi-stable operation of the rotator is made possible. Stacks of a few such platelets can be used to construct a rotator having the desired thickness.

The inhomogeneities can furthermore be combined with the source of permanent magnetic fields whereby said inhomogeneities fix the domain walls. It is proposed in the Austrian patent No. 408.700 to use the inhomogenous magnetic field of a pair of magnets. However, the use of two magnets increases the dimensions of the elements or the systems.

Only one permanent magnet is now used according to the invention. This permanent magnet maintains magnetization of the adjacent part of the rotator; the position of the border of these domains (its domain walls) changes under the influence of the magnetic field pulse and said position can be fixed through inhomogeneities as mentioned above.

| ((German terms shown in the drawing)) | |
|---|---|
| Tabelle 1 = | Table 1 |
| Bereich = | area |
| Positives Puls = | positive pulse |
| Negatives Puls = | negative pulse |
| Während des Pulses = | during pulse |
| Nach dem Puls = | after pulse |

The invention claimed is:

1. A method for modifying the polarization state of light with a magnetic, single-axial crystal that changes to a single-domain state under the influence of an outer magnetic field pulse whereby light passes through predetermined areas of the crystal, characterized in that a magnetic field pulse is applied to the crystal with a magnetic field amplitude (H) at which the crystal no longer remains in the single-domain state at the end of the pulse, but returns to a defined multi-domain state determined by the direction of the applied magnetic field.

2. A method according to claim 1, whereby domain walls are held in predetermined positions through inhomogeneities created in the crystal.

3. A method according to claim 1, whereby light beams are guided through areas of the crystal which remain magnetized with the same polarity sign as the outer magnetic field pulse after switching-off the outer magnetic field pulse.

4. A method according to claim 1, whereby light beams are guided through areas of the crystal which remain magnetized with the opposite polarity sign after switching-off the outer magnetic field pulse.

5. A method according to claim 1, whereby light beams are guided through areas of the crystal which are magnetized with the same polarity sign during influence of the outer magnetic field pulse, and which are magnetized with the opposite polarity sign after switching-off the outer magnetic field pulse.

6. A device for modifying the polarization state of light beams according to the method in claim 1, having a magneto-optical rotator made of a magnetic, single-axis crystal, which has inhomogeneities that fix the domains in predetermined positions, wherein said inhomogeneities are disposed on the sides of the crystal.

* * * * *